(12) United States Patent
Kaufman et al.

(10) Patent No.: US 10,602,213 B2
(45) Date of Patent: Mar. 24, 2020

(54) CELLULAR BROADCAST STREAMING MEDIA SELECTION

(71) Applicant: AT&T Intellectual Property I, L.P., Atlanta, GA (US)

(72) Inventors: Darren Kaufman, Sarasota, FL (US); Frank Robert Coppa, Kansas City, MO (US); Christopher Heck, Lees Summit, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/634,860

(22) Filed: Jun. 27, 2017

(65) Prior Publication Data

US 2018/0376190 A1   Dec. 27, 2018

(51) Int. Cl.

| | | |
|---|---|---|
| *H04N 21/61* | (2011.01) | |
| *H04N 21/414* | (2011.01) | |
| *H04L 29/06* | (2006.01) | |
| *H04W 72/00* | (2009.01) | |
| *H04N 21/6405* | (2011.01) | |
| *H04N 21/45* | (2011.01) | |
| *H04N 21/41* | (2011.01) | |
| *H04W 84/04* | (2009.01) | |

(52) U.S. Cl.
CPC ... *H04N 21/41407* (2013.01); *H04L 65/4076* (2013.01); *H04N 21/4126* (2013.01); *H04N 21/41422* (2013.01); *H04N 21/4524* (2013.01); *H04N 21/4532* (2013.01); *H04N 21/6131* (2013.01); *H04N 21/6405* (2013.01); *H04W 72/005* (2013.01); *H04W 84/042* (2013.01)

(58) Field of Classification Search
CPC ......... H04N 21/41407; H04N 21/4532; H04N 21/6131; H04N 21/6405; H04N 21/4126; H04N 21/4524; H04N 21/41422
See application file for complete search history.

(56) References Cited

U.S. PATENT DOCUMENTS

| | | | |
|---|---|---|---|
| 5,548,809 A * | 8/1996 | Lemson | H04B 7/0837 370/280 |
| 7,697,478 B2 | 4/2010 | Vermola et al. | |
| 8,023,883 B1 * | 9/2011 | Lee | G06Q 30/0273 455/3.02 |

(Continued)

OTHER PUBLICATIONS

Dutta, Ashutosh, et al. "Multicasting streaming media to mobile users." IEEE Communications Magazine 41.10 (2003). 81-89.

*Primary Examiner* — Pinkal R Chokshi (57) ABSTRACT

A processing system may identify a trajectory of a mobile endpoint device from a first management area toward a second management area of the cellular network, identify a first media program that is being broadcast by at least one base station in the first management area on a first broadcast channel that is tuned to by the mobile endpoint device, and determine a level of aggregate demand for the first media program in the second management area, where the level of aggregate demand is increased when it is identified that the mobile endpoint device is tuned to the first broadcast channel. The processing system may further assign the first media program to a second broadcast channel of at least one base station in the second management area based upon the level of aggregate demand, and broadcast the first media program via the second broadcast channel.

20 Claims, 3 Drawing Sheets

(56) References Cited

U.S. PATENT DOCUMENTS

| | | |
|---|---|---|
| 8,224,352 B2 | 7/2012 | Ko et al. |
| 8,503,370 B2 | 8/2013 | Klein et al. |
| 8,965,367 B1* | 2/2015 | Bartlett ............... H04W 72/087 |
| | | 370/338 |
| 9,161,280 B2 | 10/2015 | Gholmieh et al. |
| 9,253,696 B2 | 2/2016 | Rubin et al. |
| 9,706,249 B2* | 7/2017 | Hao ................. H04N 21/25841 |
| 9,887,788 B2* | 2/2018 | Wang .................... H04H 20/26 |
| 9,936,241 B2* | 4/2018 | Basra ................ H04N 21/2358 |
| 2004/0221029 A1* | 11/2004 | Jenkins ................ H04L 12/185 |
| | | 709/223 |
| 2005/0122429 A1* | 6/2005 | Katsube ................ H04H 20/26 |
| | | 348/555 |
| 2005/0177851 A1* | 8/2005 | Murao ................... H04H 20/06 |
| | | 725/75 |
| 2005/0204379 A1* | 9/2005 | Yamamori ............. H04H 60/32 |
| | | 725/15 |
| 2006/0126556 A1 | 6/2006 | Jiang et al. |
| 2008/0069071 A1* | 3/2008 | Tang ................... H04W 72/005 |
| | | 370/342 |
| 2008/0109843 A1* | 5/2008 | Ullah ..................... G06Q 30/02 |
| | | 725/34 |
| 2009/0158344 A1 | 6/2009 | Anglin, Jr. |
| 2009/0310030 A1* | 12/2009 | Litwin ................. H04N 5/4401 |
| | | 348/731 |
| 2010/0229205 A1 | 9/2010 | Hakusui |
| 2011/0305183 A1* | 12/2011 | Hsu ..................... H04W 72/005 |
| | | 370/312 |
| 2011/0314505 A1* | 12/2011 | Cho ................... H04N 21/2225 |
| | | 725/62 |
| 2013/0028118 A1 | 1/2013 | Cherian et al. |
| 2013/0055301 A1* | 2/2013 | Hao ..................... H04H 20/423 |
| | | 725/14 |
| 2013/0061275 A1* | 3/2013 | Seo ..................... H04N 21/4334 |
| | | 725/100 |
| 2013/0276017 A1* | 10/2013 | Walker ............. H04N 21/44204 |
| | | 725/25 |
| 2015/0085875 A1* | 3/2015 | Phillips ................. H04L 65/601 |
| | | 370/465 |
| 2015/0106312 A1 | 4/2015 | Chen et al. |
| 2015/0113554 A1* | 4/2015 | Stern .................... H04N 21/252 |
| | | 725/32 |
| 2015/0215738 A1 | 7/2015 | Frusina et al. |
| 2015/0365798 A1* | 12/2015 | McEvilly ............ H04L 12/1845 |
| | | 455/456.5 |
| 2016/0100329 A1 | 4/2016 | Miller et al. |
| 2016/0135016 A1* | 5/2016 | Zou ........................ H04W 4/06 |
| | | 370/312 |
| 2016/0142941 A1* | 5/2016 | Ganesh ................ H04W 28/20 |
| | | 455/41.2 |
| 2017/0142492 A1* | 5/2017 | Shen .................... H04N 21/236 |

* cited by examiner

CELLULAR BROADCAST STREAMING MEDIA SELECTION

The present disclosure relates generally to the delivery of streaming media programs via a cellular network, and more particularly to devices, computer-readable media, and methods for broadcasting a media program via a broadcast channel of a base station based upon a level of aggregate demand.

BACKGROUND

Media streaming services may interface with mobile applications, or clients residing on users' smartphone devices. For example, music may be streamed from servers of a music streaming service to a mobile application of a smartphone device using a multicasting protocol. A similar architecture may be used where video is streamed to mobile application clients from servers of a video streaming service. A telecommunications service provider network acts as a pass-through data service which simply transmits and receives Internet Protocol (IP) packets to facilitate media streaming.

SUMMARY

In one example, the present disclosure discloses a device, computer-readable medium, and method for broadcasting a media program via a broadcast channel of a base station based upon a level of aggregate demand. For example, a method may include a processing system for identifying a trajectory of a mobile endpoint device from a first management area of a cellular network toward a second management area of the cellular network, identifying a first media program that is being broadcast by at least one base station in the first management area on a first broadcast channel that is tuned to by the mobile endpoint device, and determining a level of aggregate demand for the first media program in the second management area. In one example, the level of aggregate demand for the first media program in the second management area is increased when it is identified that the mobile endpoint device is tuned to the first broadcast channel on which the first media program is being broadcast by the at least one base station in the first management area. The processing system may further assign the first media program to a second broadcast channel of at least one base station in the second management area based upon the level of aggregate demand for the first media program in the second management area and broadcast the first media program via the second broadcast channel of the at least one base station in the second management area.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for broadcasting a media program via a broadcast channel of a base station based upon a level of aggregate demand, e.g., within a cellular network. Examples of the present disclosure distribute media programs via cellular broadcast in a more efficient manner than each endpoint device receiving a unique stream through the entire system.

For instance, many users in a geographic area may want to connect to a live event stream. It is customary for each endpoint device to establish a unique data session extending through a telecommunications service provider network to a source. For cellular endpoint devices, each endpoint device may be allocated one or more unique radio frequency (RF) carriers for a data session, with subsequent wired transport back from the cell site into the core network and/or the cloud. Thus, each of the endpoint devices uses an incremental amount of bandwidth for the respective sessions. In contrast, examples of the present disclosure utilize shared RF bandwidth to deliver a series or selection of media programs, e.g., live broadcast content via the cellular network, such that all endpoint devices in a cell or sector can share the same broadcast stream and use one shared session, while the endpoint devices are not connected to each other. For instance, broadcast media programs may comprise video and/or audio relating to live sporting events, news, weather, scheduled television or audio programming, and other types of media content that are presented at a time that is selected by a network operator and/or a media provider, without input or selection from users as to the timing of the delivery of the media programs.

In one example, a cellular network receives media programs from a media provider, e.g., via a content distribution network. For instance, the media programs may be distributed via a satellite receiver or via a wired network, and placed into one or more servers of the cellular network that can distribute the content. In one example, control information and the actual media programs are delivered to cell sites, e.g., base stations and/or related components, such as radio network controllers (RNCs), base station controllers (BSCs), media control units (MCUs), and so forth. In one example, base stations broadcast the control data in the form of a manifest file, e.g., an extensible markup language (XML)/text based file. In one example, the media programs may be broadcast/transmitted via different broadcast channels, e.g., RF resource blocks or the like, which may be selected from a pool of available RF resources of the base station.

In addition, in one example the manifest file is transmitted on a particular broadcast channel, e.g., a control channel, of the base station. For instance, a known control channel may be used to broadcast a manifest file at each cell site. The manifest file for each cell site may identify the media programs that are available at that cell site, and may provide source specific multicast (SSM) Internet Protocol (IP) addresses assigned to the media programs. An endpoint device may then request, e.g., subscribe, to a particular media program by sending a request with the SSM IP address. A response may be provided to the endpoint device identifying a broadcast channel on which the media program is broadcast by the base station.

As described above, in a streaming media cellular broadcast system, media programs may be delivered to users from cell sites from which selected media programs are transmitted on multicast/broadcast channels. In connection with such a system, users will travel between various geographical areas, e.g., management areas for the management and coordination of streaming media cellular broadcast. The nature of some media programs is such that it may be limited to use or usefulness in a given geographical area. Examples of the present disclosure identify and control the media programs delivered and made available to the mobile endpoint devices that are moving through various locations and from cell site to cell site. Specific media program selection and availability are managed as part of operationalizing these types of delivery systems.

In a streaming cellular broadcast delivery system, users may travel from one management area to another management area. For example, a management area can be a large geographical area such as a large metropolitan area or geographical viewing market or smaller, sub-divided geographical areas such as local neighborhoods, cities, counties, states, or any division. In one embodiment, the smallest management area in consideration with respect to the present disclosure is a cell site, (e.g., the coverage area of a single cellular base station). Thus, a management area may include from one to many cell sites and/or base stations. In addition, the available content streams, or media programs, may vary based upon the management area, the demands and/or preferences of users in the management area, and the demands and/or preferences of users who may enter the area or who may leave the management area. Notably, a base station has limited radio frequency (RF) resources available for streaming media cellular broadcast use. As such, in one example, up to 15-20 media programs may be selected for streaming media cellular broadcast via each base station (or management area comprising multiple base stations). Thus, examples of the present disclosure select which content to fill the available slots at each base station. In addition to the demands and/or preferences of users who are in a management area, users who may enter the management area, or users who may leave the management area, the decision of what streams to offer to which subscribers in which areas may be further based upon: device capabilities, geographic entitlement, services purchased, system demands and capabilities, and so forth.

To illustrate, in the Philadelphia area, there may be a strong demand (anticipated and/or actual, aggregated over a large number of users) for streaming media cellular broadcast of a game being played by a Philadelphia-based professional sports team. Moving away from Philadelphia, there may still be a strong demand for this program, but further south approaching Baltimore, there may be a stronger demand for a game being played at the same time by a Baltimore-based professional sports team. Nevertheless, there may be enough users travelling from Philadelphia toward Baltimore and beyond that the game of the Philadelphia-based team may still be selected as one of the 15-20 streaming media cellular broadcast channels in parts of the Baltimore area (or at least for cellular base stations and/or management areas that cover major travel routes through the region). However, moving further south towards Washington, D.C., there may be far fewer users interested in the game of the Philadelphia-based team such that this game is not selected for streaming media cellular broadcast. Instead, there may be a game of a Washington, D.C.-based sports team, as well as possibly the game of the Baltimore-based sports team, that are made available via streaming media cellular broadcast, in addition to news programming, other types of arts and entertainment programming, and so forth.

The media programs that are made available via streaming media cellular broadcast may be live or pre-recorded content. In addition, the media programs may be simultaneously broadcast via the over-the-air television and/or cable/satellite broadcast systems. However, in another example, any one or more of the media programs may comprise content that is not generally available as "live" content via these other systems. In addition, the streaming media cellular broadcast system of the present disclosure may utilize centralized or distributed devices for media program selection in one or more management areas. The media program selection may use data regarding: the current users in a management area, the users who are anticipated to be entering or leaving a management area (e.g., based upon a movement or a trajectory revealed via Global Positioning System (GPS) location information or serving base station information), users' origin/home areas, the types of media programs that users in the home areas typically watch, and/or the types of content that users in the home areas more specifically prefer to access via streaming media cellular broadcast. In one example, content selection units may also utilize anonymized individual user viewing preferences for users who may be in a management area, or who may be entering or leaving a management area.

In one example, the content selection may utilize current demand data, i.e., what users are currently viewing via streaming media cellular broadcast as the users are travelling from management area to management area. For instance, multiple factors may be considered in selecting one particular media program versus another for inclusion in a limited set of media programs being broadcast via each cell site and/or management area. In addition, in one example, current viewing data of individual users may be weighted more heavily as compared to the data regarding viewing preferences of a typical user from a user's home/origin area or data regarding individual user profiles.

In one example, the content selection may also account for trends in the level(s) of aggregate demand for one or more media programs. For instance, in a management area somewhere approximately between Philadelphia and Baltimore, 4,000 users may currently be watching the game of the Philadelphia-based team and 1,000 users may currently be watching the game of the Baltimore-based team. However over time, the actual viewership of the game of the Philadelphia-based team may decline from 4,000 down to 3,000 (and anticipated to decrease further) while the demand for the game of the Baltimore-based team may increase from 1,000 to 2,500 (and anticipated to increase further). In this case, since the system is bandwidth and broadcast channel limited at each base station, the trend data can be used to make sure that the game of the Baltimore-based team will become more available while the game of the Philadelphia-based team may be more likely to give way to other media programs with higher demand, or increasing demand, if demand for the game of the Philadelphia-based team continues to decline further.

Notably, selection of media programs is performed with respect to all users in a management area over time. Examples of the present disclosure also account for users who are travelling and the types of media programs they are instantaneously consuming. For instance, examples of the present disclosure consider where a user is coming from (e.g., decreasing demand for certain content associated with a user in a management area the user is leaving) and where the user are going (e.g., increasing demand for certain content associated with the user in a management area the user is entering). These and other aspects of the present disclosure are discussed in greater detail below in connection with the examples of FIGS. 1-3.

Figure 3:
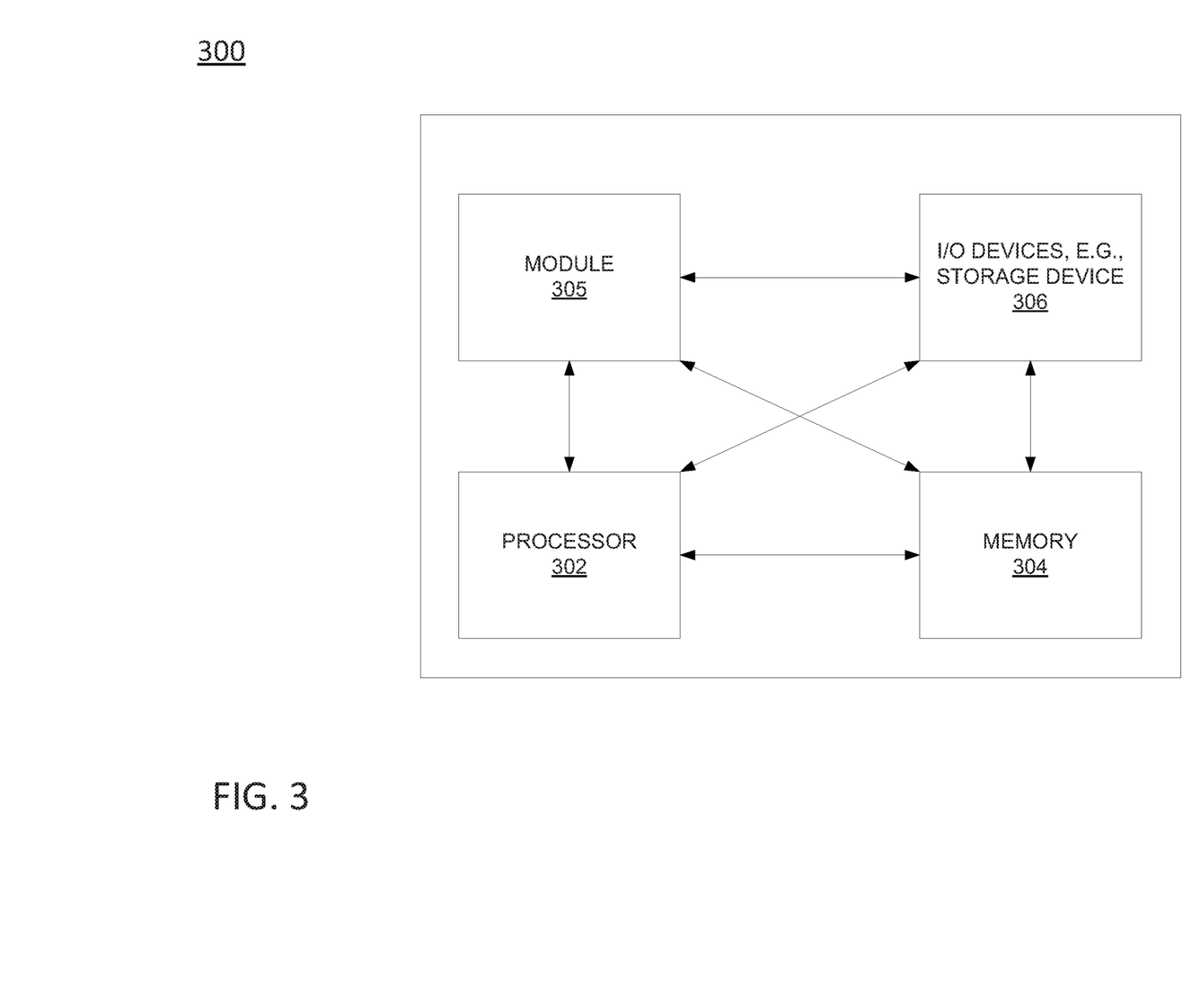
FIG. 3 illustrates an example high-level block diagram of a computer specifically programmed to perform the steps, functions, blocks, and/or operations described herein.

It should be noted that as referred to herein, the term "session" includes a sequence or flow, comprising one or more packets, segments, datagrams, frames, cells, protocol data units, service data unit, bursts, and so forth, as well as control and management communications related to the establishment, continuity, and termination of the session. The particular terminology or types of data units involved may vary depending upon the underlying network technology. Thus, the term "packet" is intended to refer to various types of data units that may comprise a session or flow. In addition, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Figure 1:
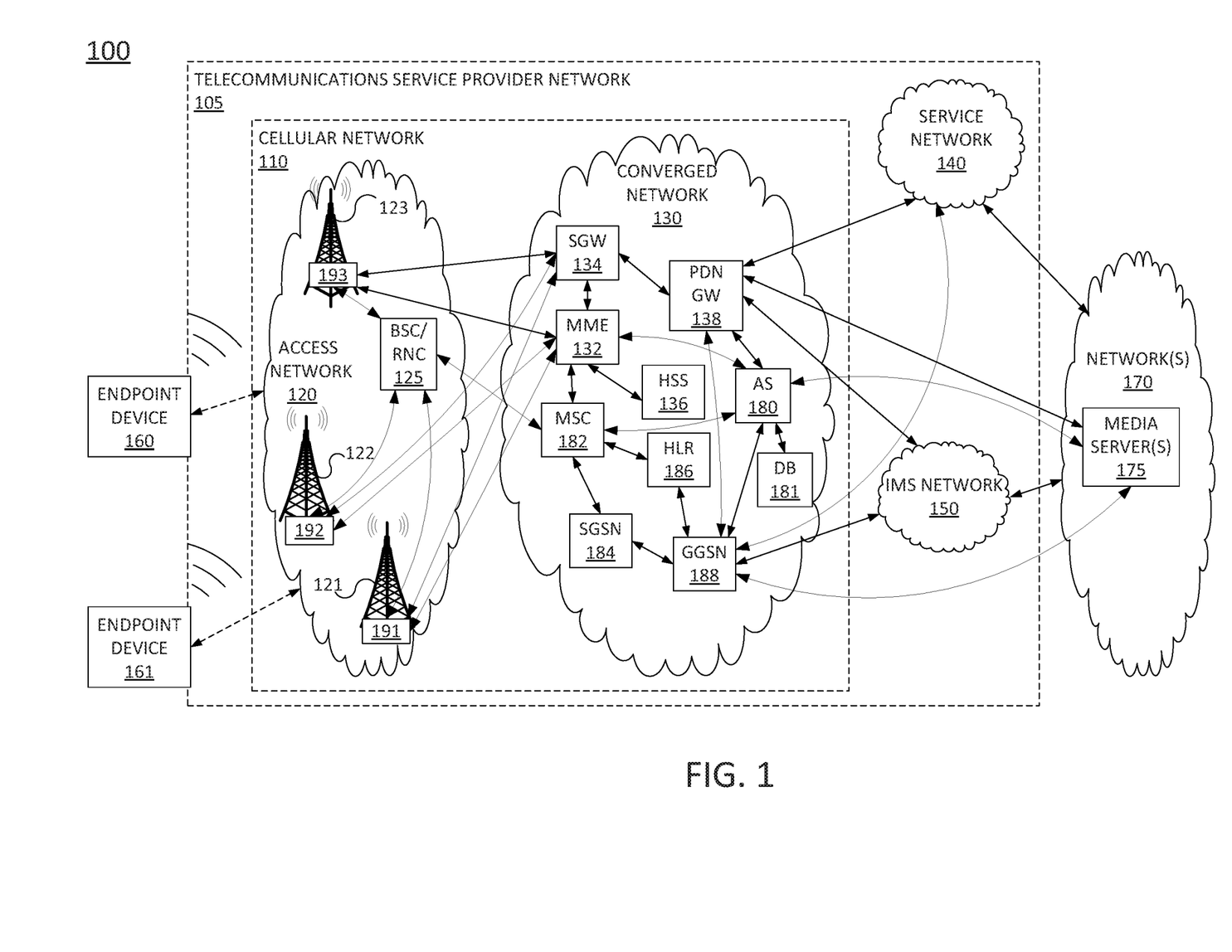
FIG. 1 illustrates an example system related to the present disclosure.

To better understand the present disclosure, FIG. 1 illustrates an example network, or system 100 that may implement embodiments of the present disclosure for broadcasting a media program via a broadcast channel of a base station based upon a level of aggregate demand. In one example, the system 100 includes a telecommunications service provider network 105. The telecommunications service provider network 105 may comprise a cellular network 110, a service network 140, and an IP Multimedia Subsystem (IMS) network 150. The system 100 may further include other networks 170 connected to the telecommunications service provider network 105. Endpoint devices 160 and 161 may each comprise a cellular telephone, a smartphone, a tablet computing device, a laptop computer, a pair of computing glasses, a wireless enabled wristwatch, or any other cellular-capable mobile telephony and computing device (broadly, a "mobile endpoint device"). In one example, endpoint devices 160 and 161 may communicate with cellular network 110 using multiple cellular communication technologies, such as GSM/time-division multiple access (TDMA) communications, wideband code division multiple access (WCDMA), CDMA2000 communications, orthogonal frequency division multiple access (OFDMA), and the like over various frequency bands.

In one example, the cellular network 110 comprises an access network 120 and a converged network 130, e.g., a cellular core network with components for 2G-4G and beyond architectures. For example, as illustrated in FIG. 1, access network 120 may include a Universal Mobile Telecommunications System (UMTS) terrestrial radio access network (UTRAN), an evolved UTRAN (eUTRAN), and a base station subsystem (BSS), e.g., a Global System for Mobile communication (GSM) radio access network (GRAN), while converged network 130 may include evolved packet core (EPC) network components, and network switching subsystem (NSS)/GSM core network and/or General Packet Radio Service (GPRS) core network components. For example, base stations 121, 122, and 123 may each comprise a base transceiver station (BTS), a NodeB, and an eNodeB. In other words, base stations 121-123 may each comprise a cell site with 2G, 3G, and 4G/LTE components. As illustrated in FIG. 1, access network 120 further includes a base station controller (BSC)/radio network controller (RNC) 125, which may perform a variety of wireless network management related tasks such as wireless channel assignments, determining transmission power levels, controlling handovers from one base station to another base station (e.g., for sessions using 2G and/or 3G infrastructure), concentrating multiple signals from endpoint devices for onward transmission to other portions of the access network 120, or converged network 130, and to perform other functions. In the present example, BSC/RNC 125 may coordinate 2G and 3G communications such as GSM/TDMA communications, WCDMA or CDMA2000 communications, and the like via base stations 121-123.

In one example, each of the base stations 121-123 may have an associated media coordination unit (MCU) 191-193. MCUs 191-193 may receive manifest files (or control data that is used to create manifest files) and media programs, and may re-broadcast the manifest files and media programs via RF broadcast channels of the respective base stations 121-123, as described in greater detail below. In one example, each of MCUs 191-193 may comprise a computing system, such as computing system 300 depicted in FIG. 3, specifically configured to perform various steps, functions, and/or operations in connection with examples of the present disclosure for broadcasting a media program via a broadcast channel of a base station based upon a level of aggregate demand.

In one example, converged network 130 provides various functions that support wireless services in the 2G-4G/LTE environment. For instance, network devices Mobility Management Entity (MME) 132 and Serving Gateway (SGW) 134 provide various functions for LTE-based communications. For example, MME 132 is the control node for the LTE access networks, such as eUTRAN portions of access network 120 (e.g., eNodeBs). In one embodiment, MME 132 is responsible for user equipment (UE)/mobile endpoint device tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G network portions. For LTE-based communications, converged network 130 may also include a Home Subscriber Server (HSS) 136 that contains subscription-related information (e.g., subscriber profiles), performs authentication and authorization of a wireless service user, and provides information about the subscriber's location. The converged network 130 may also comprise a packet data network (PDN) gateway 138 which serves as a gateway that provides access between the converged network 130 and various data networks, e.g., service network 140, IMS network 150, networks 170, and the like. The packet data network gateway 138 is also referred to as a PDN gateway, a PDN GW or a PGW. In one example, the LTE/EPC portions of converged network 130 may comprise an Internet Protocol (IP)/multi-protocol label switching (MPLS) backbone that supports both real-time and non-real-time service delivery.

As mentioned above, converged network 130 may also include NSS/GSM core network and/or GPRS core network components. For example, converged network 130 may include one or more mobile switching centers (MSCs) for each wireless access network that forms part of the system 100, such as MSC 182 for access network 120. The converged network 130 may further include one or more home location registers (HLRs), such as HLR 186, which functions as a central repository of authentication and service validation information, subscription information, and other information pertaining to user subscriptions and services. Similarly, respective visiting location registers (VLRs) may be integrated within each MSC, and may function as temporary repositories of authentication and service validation information, subscription information, and other information pertaining to visiting user subscriptions and services when an endpoint device is located in a particular geographic region serviced by a particular MSC/VLR. For example, MSC 182 may be designated to serve and administer a first coverage area including access network 120. Thus, MSC 182 may maintain, e.g., in a VLR, user profile records for endpoint devices currently serviced by base stations within the portion of the network that is the responsibility of MSC 182 (e.g., endpoint device 160). It should be noted that in one example, a geographic region serviced by a particular MSC/VLR may comprise a management area for streaming media cellular broadcast. However as stated above, in other examples the management area(s) may be of a larger or smaller size.

Converged network 130 may also include GPRS network elements for handling data calls to and from endpoint devices. Such network elements may include a serving GPRS support node (SGSN) 184, a gateway GPRS support nodes (GGSN) 188, and related support components including media servers, application servers, and the like. An SGSN refers to a network node responsible for communicating with endpoint devices and routing of data calls. Similar to MSC 182, SGSN 184 may have specific coverage areas and be assigned to handle specific wireless access networks of the system 100. A GGSN refers to a network node responsible for the interworking between a GPRS network (e.g., components of converged network 130 that support GPRS services and functionality) and external packet switched networks, e.g., service network 140, IMS network 150, and networks 170. Thus, FIG. 1 illustrates various connections between GGSN 188 and other components of system 100. In one example, the GPRS portions of converged network 130 may comprise an IP/MPLS. In addition, converged network 130 may include various links and interfaces between 2G/3G components and 4G/LTE components for coordination of various services. For instance, connections between MME 132 and MSC 182 and between PDN GW 138 and GGSN 188 are shown in FIG. 1. For ease of illustration, other connections may exist but are omitted from the example of FIG. 1.

In one example, IMS network 150 may include a proxy call session control function (P-CSCF), a serving call session control function (S-CSCF), a billing and traffic (B&T) server, an ENUM (tElephone NUmbering Mapping) server 168, a domain name service (DNS) server, and other components (not shown). In one example, service network 140 may comprise one or more devices for providing services to subscribers, customers, and or users. For example, telecommunications service provider network 105 may provide a cloud storage service, web server hosting, and other services. As such, service network 140 may represent aspects of telecommunications service provider network 105 where infrastructure for supporting such services may be deployed.

In the example of FIG. 1, converged network 130 may include an application server (AS) 180. In one example, AS 180 may comprise a computing system, such as computing system 300 depicted in FIG. 3, specifically configured to perform various steps, functions, and/or operations in connection with broadcasting a media program via a broadcast channel of a base station based upon a level of aggregate demand, in accordance with the present disclosure. In one example, converged network 130 may also include a database (DB) 181, e.g., a physical storage device integrated with AS 180, or attached or coupled to AS 180, to store various information regarding media streaming services, users, and/or their endpoint devices. For instance, DB 181 may store media program and metadata regarding the media programs, e.g., information such as the titles, durations, formats, encoding types, ratings, etc., of the media programs. DB 181 may also store control information related to the broadcasting of media programs from base station sites, e.g., base stations 121-123 in access network 120. For instance, control information may include selections of broadcast channels to use to broadcast different media programs via the base stations 121-123 and selections of SSM IP addresses to be associated with the same and different media programs for the various base stations 121-123. In one example, metadata and/or control information relating to media programs may be stored in manifest files that may be retrieved and sent by AS 180 to MCUs 191-193. In another example, AS 180 may retrieve metadata and/or control information relating to media programs from DB 181 and may generate the manifest files before sending the manifest files to MCUs 191-193. In still another example, AS 180 may retrieve metadata and/or control information relating to media programs from DB 181 and may forward the metadata and/or control information to MCUs 191-193, where MCUs 191-193 may create respective manifest files to be broadcast at each of the base station sites/base stations 121-123.

DB 181 may also store data/information regarding management areas of the cellular network 110, media programs currently being viewed on various endpoint devices, individual user profiles, model user profiles associated with different management areas, current management areas or other location information of various endpoint devices, (geographical) trajectories of endpoint devices, search statistics regarding various media programs, historical viewership information regarding various media programs viewed via cellular broadcast, historical and/or current viewership information regarding various media programs viewed via the over-the-air television and/or cable/satellite broadcast systems, and so forth. In one example, AS 180 may access such information and utilize such information to calculate levels of demand for different media programs in different management areas, and to determine which media programs are to be broadcast via a limited number of broadcast channels at one or more base stations in one or more management areas of the cellular network 110, in accordance with the present disclosure.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. The other networks 170 may comprise one or more media servers 175, which may be operated by one or more media providers, and which may provide various types of media programs. In one example, media servers 175 may comprise one or more computing devices for providing media to various recipient devices via media streaming sessions. For instance, media servers 175 may comprise IP multicast servers for providing streaming media to various recipient devices over various networks which may employ the same or different types of communication technologies. In one example, media servers 175 may store complementary or redundant copies of the same media programs. Thus, any one or more of media servers 175 may be selected as a source to stream selected media programs to recipient devices.

In one example, media servers 175 may broadcast media programs using an IP multicast protocol. For instance, one of the media servers 175 may comprise a source to send a media program to a designated group IP address. Recipient devices may then indicate a desire to receive the media program by sending a join request that indicates the group address. Routers, switches, and other devices in transport paths between the source and various recipient devices may then construct distribution trees which ingest the media program from the source, replicate the media program and transmit copies of the media program toward the recipient devices. Thus, for example, AS 180 may receive the media program from the one of the media servers 175 by sending a join request indicating the IP group address for the particular media program, where routers, switches, gateways, and the like in one or more networks between the one of the media servers 175 and AS 180 may route the media program to AS 180 (and any other recipient devices that join the group) in response to the join request. AS 180 may then propagate the media program toward MCUs 191-193, e.g., via PDN GW 138 and SGW 134 (e.g., for 4G/LTE service) and/or via GGSN 188, SGSN 184, and BSC/RNC 125 (e.g., for 2G/3G service). For example, AS 180 may generate its own IP multicast stream with MCUs 191-193 sending join requests to join the group associated with the stream, or AS 180 may unicast the media program to one or more of the MCUs 191-193.

Alternatively, or in addition, MCUs 191-193 may also send join request indicating the IP group address for the IP multicast stream associated with the media program sourced from the one of the media servers 175. In other words, MCUs 191-193 may comprise independent recipient devices associated with the media program that may be multicast by the one of the media servers 175. In such an example, the media program may be propagated from the one of the media servers 175 to PDN GW 138 and/or GGSN 188 and onward through the converged network 130 and access network 120 to the respective MCUs 191-193 without AS 180 serving as a point of re-multicasting. However, in such an example, AS 180 may still perform management functions related the broadcasting of the media program via RF broadcast channels of the respective base stations 121-123. In any of the foregoing examples, the MCUs 191-193 receive the media program and may then rebroadcast the media program via RF broadcast channels via base stations 121-123. In this regard, MCUs 191-193 may receive the media program over 2G/3G infrastructure or via 4G/LTE infrastructure, and may rebroadcast the media program via NodeB portions of base stations 121-123, respectively, or via eNodeB portions of base stations 121-123, respectively.

In accordance with the present disclosure, the cellular network 110 may be divided into different management areas comprising one or more base stations/cell sites. For instance, in the example of FIG. 1, a first management area may comprise base stations 121 and 122, while a second management area may comprise base station 123. In one example, AS 180 may access information from DB 181, such as data/information regarding management areas of the cellular network 110, media programs currently being viewed on various endpoint devices, individual user profiles, model user profiles associated with different management areas, current management areas or other location information of various endpoint devices, (geographical) trajectories of endpoint devices, search statistics regarding various media programs, historical viewership information regarding various media programs viewed via cellular broadcast, historical and/or current viewership information regarding various media programs viewed via the over-the-air television and/or cable/satellite broadcast systems, and so forth. AS 180 may then utilize such information to calculate levels of aggregate demand for different media programs in the first management area (base stations 121 and 122) and in the second management area (base station 123). In addition, AS 180 may determine which media programs are to be broadcast via a limited number of broadcast channels at the base stations in the respective first management area and second management area based upon the levels of aggregate demand, in accordance with the present disclosure. For instance, AS 180 may perform various operations that are described in greater detail below in connection with the example method 200 of FIG. 2.

In one example, AS 180 may select media programs to be broadcast via the available broadcast channels and may notify the base station(s) and/or the MCU(s) accordingly. For instance, AS 180 may send control plane communications to and receive control plane communications from base stations 121-123 and/or the associated MCUs 191-193 to determine available RF resources, such as OFDMA resource blocks. In one example, for a particular media program, and for a particular one of base stations 121-123, AS 180 may select RF resources for the media program to be broadcast and may notify the base station and/or the MCU accordingly. In another example, AS 180 may select the media programs to be broadcast via the broadcast channels of base stations of the respective management areas, but the selection of the actual broadcast channels/RF resources is left to other devices, such as the base stations 121-123, BSC/RNC 125, or the like.

As described above, the base station and/or the associated MCU may receive the media programs via a variety of paths through the system 100. In any event, the one of the base stations 121-123 and/or the one of the associated MCUs 191-193 may then rebroadcast the media programs via the selected RF resources. In another example, AS 180 may communicate with MME 132 and/or MSC 182 to indicate an intent to broadcast one or more media programs via base stations 121-123. In turn, MME 132 and/or MSC 182 may then communicate with base stations 121-123, MCUs 191-193, and/or BSC/RNC 125 to determine available RF resources of the respective base stations 121-123, to select RF resources for broadcasts of various media programs and to instruct the respective base stations 121-123, MCUs 191-193, and/or BSC/RNC 125 to utilize the RF resources that are selected for the respective media programs.

In addition, as described above, MCUs 191-193 may be provided with or may generate manifest files associated with media programs that are being broadcast or that is to be broadcasted via base stations 121-123, respectively. For example, for one of the base stations 121-123, a manifest file may include identification(s) of the media program(s) (e.g., one or more live audio or video programs) and one or more source specific multicast (SSM) IP addresses associated with the one or more live audio or video programs. In one example, the manifest file may include additional information for each media program, such as a duration of the media program, a rating of the media program, a formatting and/or an encoding of the media program, and so on. In one example, the respective manifest files may be broadcast via one or more dedicated control channels of the base stations 121-123. For example, the one or more dedicated control channels may be designated in advance, and may be known by endpoint devices such that endpoint devices may obtain manifest files via the relevant control channel(s). For instance, in one example, endpoint devices 160 and 161 may determine the relevant control channel(s) to receive manifest files via out-of-band communications with AS 180, MME 132, and/or MSC 182. In one example, the control channel (s) for broadcasting manifest files may be selected by AS 180, MME 132 and/or MSC 182 in the same or in a similar manner as described above in connection with the selection of RF resources for broadcasting the actual media program.

Endpoint devices 160 and 161 may receive the manifest files from one or more of the base stations 121-123 and may then present information regarding available media programs for the users of such devices. For instance, the endpoint devices 160 and 161 may present titles, start and end times, durations, ratings, short descriptions, and so forth pertaining to the media programs that are identified in the manifest file(s). Endpoint devices 160 and 161 may present the information via a display screen or via audio output. Endpoint devices 160 and 161 may also receive selections of media programs from users and/or applications of the endpoint devices. For instance, a user of endpoint device 160 may select media program "X" which is indicated to be broadcast. In response to such a selection, the endpoint device 160 may retrieve a SSM IP address of the selected media program from the manifest file obtained from one of the base stations 121-123. For instance, the endpoint device may select the SSM IP address from the manifest file of the one of the base stations 121-123 that is the closest to the endpoint device 160 or that presents the highest signal-to-noise ratio, or based upon a similar criteria. In one example, the endpoint device may send a "subscribe" request that includes the SSM IP address assigned to the media program in order to subscribe to the particular media program.

The "subscribe" request may be sent to the one of the base stations 121-123, MMUs 191-193, MME 132, MSC 182, or AS 180, depending upon the particular architecture or network configuration and depending upon which component is responsible for the selection and/or the assignment of RF resources to the media programs. In response to the "subscribe" request, one of the base stations 121-123, MMUs 191-193, MME 132, MSC 182, or AS 180 may then determine the RF resources of the one of the base stations 121-123 on which the media program associated with the SSM IP address is being broadcast, and may send a response indicating to the endpoint device 160 the particular RF resources on which the media program is being broadcast via the one of the base stations 121-123.

In one example, any one or more devices receiving the "subscribe" request may verify that the endpoint device 160 is permitted to receive the media program. For instance, certain media programs may be restricted to certain subscribers, e.g., based upon whether the subscriber has paid to receive the media program(s), based upon an age of the subscriber, etc. For instance, a parent that owns an endpoint device, e.g., a subscriber, may indicate to the cellular network 105 that endpoint device 161 is for use by the subscriber's child and should not receive media programs via cellular broadcast. Thus, a "subscribe" request from such a device may be denied. In one example, the response may include an encryption key or the like to allow the endpoint device 160 to access the media program(s), e.g., when the subscriber and/or the endpoint device is authorized to receive the media program(s) that are broadcast. Endpoint device 160 may then tune the RF resources identified, receive a media program that is broadcast via the RF resources, and present the media program at the endpoint device 160.

In one example, the device receiving the "subscribe" request may forward a notification of the "subscribe" request to AS 180, which may store the information regarding "subscribe" request in DB 181. In one example, AS 180 may further retrieve this information from DB 181 for use in determining a level of aggregate demand in the first management area and/or the second management area for the particular media program that is the subject of the "subscribe" request.

The system 100 may also provide for continuity of an endpoint device receiving a media program as the endpoint device moves from one location to another, or as the radio environment changes. For example, endpoint device 160 may obtain different manifest files from each of base stations 121-123. The same media program may be identified in the different manifest files, but may have a different SSM IP addresses associated with the media program. In addition, different RF resources may be utilized for broadcasting the same media program via different ones of the base stations 121-123. To illustrate, endpoint device 161 may receive a media program via a first set of RF resource blocks from base station 121. However, endpoint device 161 may be moving toward base station 122, such that a received signal strength indicator (RSSI), or the like, of base station 122 may increase to the point that the RSSI of base station 122 becomes greater than the RSSI of base station 121. At this time, the endpoint device 161 may send a "subscribe" request that includes the SSM IP address assigned to the media program with respect to base station 122. The "subscribe" request may be sent to the base station 122, MMU 192, MME 132, MSC 182, or AS 180, depending upon the particular architecture or network configuration and depending upon which component is responsible for the selection and/or the assignment of RF resources to the media program. In response to the "subscribe" request, the base station 122, MMU 192, MME 132, MSC 182, or AS 180 may then determine the RF resources of the base station 122 on which the media program is being broadcast, and may send a response indicating to the endpoint device 161 the particular RF resources on which the media program is being broadcast via the base station 122. Endpoint device 160 may then tune to the RF resources identified, and continue to receive the media program via the RF resources of the base station 122. A similar process may be followed as the endpoint device 161 moves away from base station 122 toward base station 123.

In one example, the response may further include an encryption key to allow the endpoint device 161 to access the media program via base station 122. For instance, it may first be verified whether the endpoint device 161 is authorized to receive the media program via base station 122, and if so, the encryption key may be provided in the response.

Notably, even though endpoint device 161 may be authorized to receive the media program via base station 121, it may not automatically be the case that endpoint device 161 is also authorized to receive the media program via base station 122. For example, some content may have a geographic restriction such that an endpoint device is not permitted to receive the media program when outside of a particular area, notwithstanding that other endpoint devices may be permitted to receive the same media program outside of such an area. In addition, such geographic restrictions may or may not be coterminous with management areas of the cellular network 110.

In the example of FIG. 1, and as described above, the cellular network 110 may include at least a first management area comprising base stations 121 and 122, and a second management area comprising base station 123. In one example, AS 180 may track the locations and trajectories for endpoint devices, including endpoint devices 160 and 161. The locations may be tracked by receiving GPS location information of endpoint devices at AS 180, or by AS 180 subscribing to location data of the endpoint devices which are tracked and stored by another component of cellular network 110, such as HSS 136, MME 132, etc. The trajectories may be calculated from changing location information of an endpoint device over time. In one example, the trajectories of endpoint devices may be determined by maintaining an adjacency graph of nodes comprising base stations/cell sites, and determining that an endpoint device may enter any cell site that is adjacent to the current cell site, for instance. In one example, a distinction may be made for endpoint devices that are determined to be in motion, versus those that are stationary. In other examples, trajectories of endpoint devices may be determined in various other ways, such as endpoint devices estimating their own directions of movement and velocities, and reporting such information to AS 180 and/or other components of cellular network 110. When a trajectory indicates that an endpoint device will be leaving one management area and entering another, AS 180 may update calculations of aggregate demand for different media programs in the respective management areas. Further details regarding such operations are described in greater detail below in connection with the example method 200 of FIG. 2.

It should be noted that the system 100 has been simplified. In other words, the system 100 may be implemented in a different form than that which is illustrated in FIG. 1. For example, the system 100 may be expanded to include additional networks, such as network operations center (NOC) networks and additional access networks, as well as additional base stations, management areas, and so forth. The system 100 may also be expanded to include additional network elements such as border elements, routers, switches, policy servers, security devices, gateways, a content distribution network (CDN), and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, MCUs 191-193 may be integrated within the respective base stations 121-123. Similarly, although the AS 180 and DB 181 are illustrated as components of service network 140, and media servers 175 are illustrated as components within networks 170, in other examples, any one or more of these components may be deployed in a different configuration. For example, AS 180 and DB 181 may be deployed within IMS network 150, within converged network 130, within access network 120, and so on.

In addition, FIG. 1 illustrates a single AS 180 (and DB 181) that is described as being configured to perform various steps, functions, and/or operations in connection with broadcasting a media program via a broadcast channel of a base station based upon a level of aggregate demand, in accordance with the present disclosure. In particular, AS 180 is described as performing operations for managing streaming media cellular broadcast in the first management area comprising base stations 121 and 122 as well as in the second management area comprising base station 123. However, in another example, the first management area and the second management area may have separate "management" devices (and respective databases) for performing the same or similar operations as 180. In such an example, the respective management devices may communicate with one another to share various types of information regarding the respective management areas, and the users and/or mobile devices associated with the management areas. For instance, a first management device of the first coverage area may share information regarding what media program is currently tuned to by the endpoint device 160 (e.g., as the endpoint device 160 is detected to be leaving the first management area and entering the second management area by either the first management device or a second management device of the second coverage area). Similarly, in another example, any one or more of MCUs 191-193 may be configured to perform various steps, functions, and/or operations in connection with broadcasting a media program via a broadcast channel of a base station based upon a level of aggregate demand, e.g., as an alternative or in addition to AS 180. For instance, MCU 191 may perform operations for managing streaming media cellular broadcast for the first management area comprising base stations 191 and 192, while MCU 193 may perform operations for managing streaming media cellular broadcast for the second management area comprising base station 123.

In addition, various elements of access network 120, converged network 130, and IMS network 150 are omitted for clarity, including gateways or border elements providing connectivity between such networks, internal routers within converged network 130, and so on. Similarly, due to the relatively large number of connections available between devices in the system 100, various links between MME 132, SGW 134, base stations 121-123, MCUs 191-193, SMSC 180, PDN GW 138, SMSG 180, and other components of system 100 are also omitted for clarity. Moreover, although aspects of the present disclosure have been discussed above in the context of a converged network with GSM/TDMA-based, GPRS/CDMA-based, and LTE/OFDMA-based components, examples of the present disclosure are not so limited. For example, the teachings of the present disclosure can be applied to networks and systems that use other types of wireless/cellular technologies, such as enhanced data rates for GSM evolution (EDGE), IS-95, or a future technology or standard-based network, e.g., a 5G network, and so forth. Similarly, although aspects of the present disclosure have been discussed above in the context of SSM IP streaming media cellular broadcast, in other, further, and different examples, other types of cellular broadcast technologies may be utilized. Thus, these and other modifications are all contemplated within the scope of the present disclosure.

Figure 2:
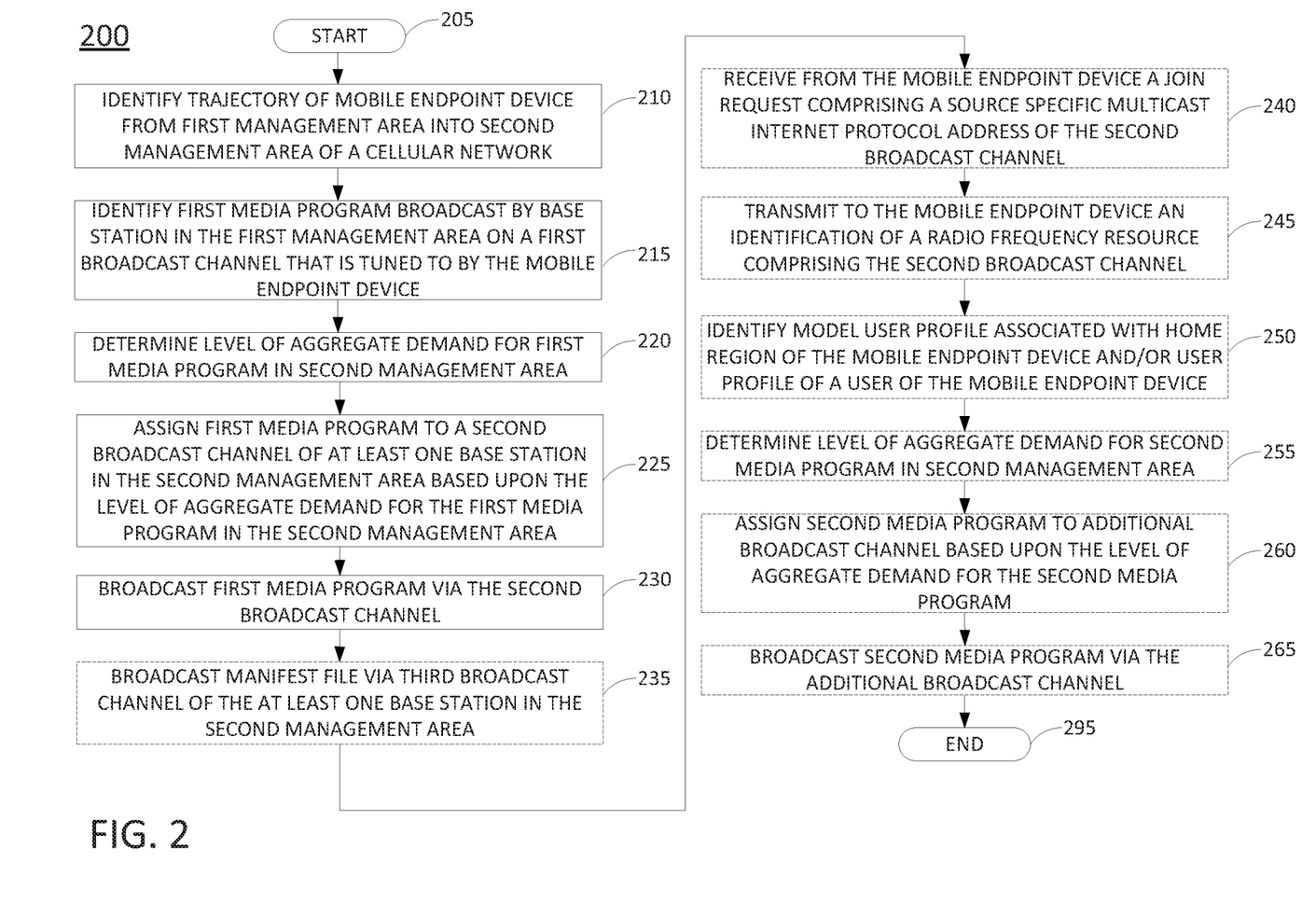
FIG. 2 illustrates a flowchart of an example method for broadcasting a media program via a broadcast channel of a base station based upon a level of aggregate demand.

FIG. 2 illustrates a flowchart of an example method 200 for broadcasting a media program via a broadcast channel of a base station based upon a level of aggregate demand, in accordance with the present disclosure. In one example, steps, functions and/or operations of the method 200 may be performed by a centralized cellular network-based device, e.g., deployed in an evolved packet core (EPC), such as AS 180, or AS 180 in conjunction with other components of the system 100, such as DB 181, MCUs 191-193, and so forth. In another example, the method 200 may be performed by a device deployed in a cellular access network, e.g., in a UTRAN or an eUTRAN, such as a base station and/or an MCU. In one example, the steps, functions, or operations of method 200 may be performed by a computing device or processing system 300, and/or processor 302 as described in connection with FIG. 3 below. For instance, computing device or system 300 may represent AS 180 or an MCU of the present disclosure. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, e.g., comprising an application server, base station, and/or an MCU, or an application server, base station, and/or an MCU in conjunction with other components. For illustrative purposes, the method 200 is described in greater detail below in connection with an example performed by a processing system. The method begins in step 205 and proceeds to step 210.

At step 210, the processing system identifies a trajectory of a mobile endpoint device from a first management area of a cellular network into a second management area of the cellular network. In one example, the identifying a trajectory of the mobile endpoint device from a first management area into a second management area is based on at least one of GPS location information, a sequence of base stations serving the mobile endpoint device in the cellular network, or base station triangulation information for the mobile endpoint device in the cellular network. The trajectory may be calculated from changing location information of the mobile endpoint device over time. In one example, the trajectory of the endpoint device may be determined by maintaining an adjacency graph of nodes comprising base stations/cell sites, and determining that the endpoint device may enter a cell site in the second management area that is adjacent to a cell site that is in the first management area and that is currently serving the mobile endpoint device. In one example, the operations of step 210 include identifying trajectories of a plurality of mobile endpoint devices travelling toward or heading into the second management area from the first management area or from other management areas.

At step 215, the processing system identifies a first media program that is being broadcast by at least one base station in the first management area on a first broadcast channel that is tuned to by the mobile endpoint device. In one example, the operations of step 215 may include requesting an identification of the first media program that is being broadcast by the at least one base station in the first management area on the first broadcast channel that is tuned to by the mobile endpoint device, and receiving the identification in response to the request. In one example, the request is sent to and the identification is received from the mobile endpoint device. In one example, the request is sent to and the identification is received from a "management device" in the first management area. For instance, the request may be sent to the at least one base station in the first management area, a MCU in the first management area, or to another device that stores information regarding which media programs are tuned to by mobile endpoint devices and/or which media program(s) has/have been the subject(s) of requests for identification of an RF resource from mobile endpoint devices.

At step 220, the processing system determines a level of aggregate demand for the first media program in the second management area. In particular, the level of aggregate demand for the first media program in the second management area is increased when it is identified that the mobile endpoint device is tuned to the first broadcast channel on which the first media program is being broadcast by the at least one base station in the first management area. As mentioned above, in one example, step 210 includes identifying trajectories of a plurality of other mobile endpoint devices travelling into the second management area. Accordingly, in one example, at step 220 the level of aggregate demand for the first media program in the second management area is increased when it is identified that the plurality of other mobile endpoint devices is tuned to broadcast channels on which the first media program is being broadcast. In one example, the level of aggregate demand may be calculated in accordance with a formula $(a*T)+(b*U)+(c*V)+(d*W)+(e*X)+(f*Y)+(g*Z)+ \ldots (N)$, where a-g are weightings, T-Z are scores for various factors, and N represents any number of additional weighted factors. For instance, T may represent a number or percentage of mobile endpoint devices currently in the second management area that are tuned to the first media program, U may represent a number or percentage of mobile endpoint devices having trajectories into the second management area that are currently tuned to the first media program in a different management area, V may represent an affinity for the first media program according to a model user profile associated with the second management area, W may represent a number of times that the first media program has been searched for within a given time period, X may represent a historical viewership number or percentage for the first media program (or a similar media program, such as previous game involving a same professional sports team) via cellular broadcast, Y may represent a historical viewership number or percentage for the first media program (or a similar media program) via over-the-air television and/or cable/satellite broadcast systems, Z may represent a composite affinity for the first media program according to individual user profiles of users associated with mobile endpoint devices having trajectories travelling into the second management area, and so forth. The foregoing is just one example of how various factors may be utilized to determine an aggregate level of demand for a media program in a management area.

As stated above, in one example, current viewing data of individual users may be weighted more heavily as compared to the data regarding viewing preferences of a typical user from a user's home/origin area or data regarding individual user profiles. In addition, in one example step 220 may further include calculating levels of aggregate demand for a plurality of media programs in the second management area.

At step 225, the processing system assigns the first media program to a second broadcast channel of at least one base station in the second management area based upon the level of aggregate demand for the first media program in the second management area. It should be noted that a limited number of broadcast channels is available at the at least one base station in the second management area. In one example, at step 225 a subset of the plurality of media programs is selected for broadcasting via the limited number of broadcast channels based upon the levels of aggregate demand.

For instance, in one example, N is the limited number of broadcast channels that is available at the at least one base station in the second management area, wherein a top N media programs having the highest N levels of aggregate demand in the second management area are selected for broadcasting via the limited number of broadcast channels. Accordingly, the first media program may be assigned to the second broadcast channel when the first media program is one of the top N media programs having the highest N levels of aggregate demand in the second management area.

At step 230, the processing system broadcasts the first media program via the second broadcast channel of the at least one base station in the second management area. In one example, the second broadcast channel may comprise a particular RF resource such as a particular frequency or frequencies, time slot(s), a scrambling code and/or a spreading sequence, and the like, depending upon the particular type of air interface and cellular technology utilized in the second management area (e.g., GSM/TDMA, GPRS/CDMA, LTE/OFDMA, etc.). In one example, step 230 may include sending an instruction to a base station, MCU, or the like, to obtain the first media program. For instance, in response to the instruction, the base station, MCU, or the like may subscribe to the media program from a source of the media program, such as by sending a join request to a SSM IP address associated with the media program.

At optional step 235, the processing system may broadcast a manifest file via a third broadcast channel of the at least one base station in the second management area. For instance, the manifest file may include identifications of a plurality of broadcast channels on which a plurality of media programs is broadcast at the at least one base station in the second management area and identifications of the plurality of media programs. More specifically, the manifest file may include an identification of the first media program and an identification of the second broadcast channel. In one example, the identifications of the plurality of broadcast channels comprise respective SSM IP addresses.

At optional step 240, the processing system may receive from the mobile endpoint device a "join" or a "subscribe" request comprising a SSM IP address of the second broadcast channel.

At optional step 245, the processing system may transmit to the mobile endpoint device an identification of a radio frequency resource comprising the second broadcast channel, in response to the subscribe request received at optional step 240.

At step 250, the processing system identifies a model user profile associated with a home region of the mobile endpoint device and/or a user profile of a user of the mobile endpoint device. In accordance with the present disclosure, the model user profile indicates an affinity of users in the home region for at least a second media program, among other types of information and data. In accordance with the present disclosure, the (individual) user profile may also indicate an affinity of the user for the second media program. In one example, the affinity may be indicated with respect to the second media program specifically, or with respect to a category or type of programming in which the second media program may be categorized. In one example, the affinity may be indicated as a score, a percentage, or a degree of preference for the second media program, or the category/type of programming.

At step 255, the processing system determines a level of aggregate demand for the second media program in the second management area. Step 255 may comprise similar operations to step 220 discussed above. In particular, the level of aggregate demand for the second media program in the second management area is increased when the model user profile indicates the affinity for the second media program and/or when the user profile indicates the affinity of the user for the second media program.

At optional step 260, the processing system may assign the second media program to an additional broadcast channel of the at least one base station in the second management area based upon the level of aggregate demand for the second media program in the second management area. Step 260 may comprise similar operations to step 225 discussed above. For instance, the second media program may be assigned to the additional broadcast channel when the second media program is one of the top N media programs having the highest N levels of aggregate demand in the second management area.

At optional step 265, the processing system may broadcast the second media program via the additional broadcast channel of the at least one base station in the second management area. Step 265 may comprise similar operations to step 230 discussed above.

Following step 230 or any of the optional steps 235-265, the method 200 may proceed to step 295 where the method 200 ends. In addition, it should be noted that the method 200 may be expanded to include additional steps, may be modified to perform different steps, or may omit certain steps. For instance, in one example the method 200 may further include the processing system determining a level of aggregate demand for the first media program in the first management area. For instance, the level of aggregate demand for the first media program in the first management area may be decreased when it is identified that the mobile endpoint device is tuned to the first broadcast channel on which the first media program is being broadcast by the at least one base station in the first management area and that the trajectory of the mobile endpoint device is from the first management area traveling into or heading toward the second management area. It should be noted that in such an example, the decreasing of the level of aggregate demand is based upon the trajectory, i.e., the anticipation that the mobile endpoint device will leave the first management area, not the mobile endpoint device actually leaving the first management area. However, in one example, an actual departure of the mobile endpoint device from the first management area may comprise another factor in reducing (e.g., further reducing) the level of aggregate demand for the first media program in the first management area according to a formula, such as using the example formula given above. In such an example, the method 200 may further include reassigning the first media program from a first broadcast channel to a new broadcast channel, e.g., a fourth broadcast channel of at least one other base station in the first management area based upon the level of aggregate demand for the first media program in the first management area.

In another example, the manifest file that is broadcast at step 235 may include an identification of the second media program and the additional broadcast channel on which the second media program is being broadcast. In still another example, the method 200 may be expanded to include an additional step or steps of updating the manifest file and broadcasting the updated manifest file via the third broadcast channel. In another example, the method 200 may include obtaining user profiles of users associated with mobile endpoint devices having trajectories into the second management area or model user profiles from home regions of the respective mobile endpoint devices, and calculating levels of aggregate demand for various media programs in accordance with the (individual) user profiles and/or model user profiles. Similarly, the method 200 may include obtaining user profiles of users associated with mobile endpoint devices that are already determined to be present in the second management area, or of users and/or their mobile endpoint devices for which the second management area is a home region, and calculating levels of aggregate demand for various media programs in accordance with the user profiles. In general, modifications to the method 200 of this nature may correspond to one or more fields in a formula for calculating a level of aggregate demand for a media program in a management area.

In another example, the processing system may unicast or multicast the streaming media content to one or more base stations. In one example, the processing system may make multiple copies of the streaming media content, e.g., higher or lower quality video, such as with higher or lower bit rates, video resolutions, etc., and may select to provide different copies for broadcasting via different base stations, e.g., for adaptive bitrate streaming. Alternatively, or in addition, the processing system may select to send different versions of the streaming media content at different times and/or to different base stations, e.g., due to detected congestion, based upon which components of a base station may be used to broadcast the streaming media contents via the first broadcast channel, e.g., 2G/3G components versus 4G/LTE components, and so forth. In still another example, steps, functions, and/or operations of the method 200 may be performed by multiple devices in coordination with one another. For examples, steps 210-230 may be performed by an application server, e.g., deployed in a converged network or cellular core network, while steps 230-245 may be performed by a base station or media control unit (MCU). Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for broadcasting a media program via a broadcast channel of a base station based upon a level of aggregate demand, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for broadcasting a media program via a broadcast channel of a base station based upon a level of aggregate demand (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for broadcasting a media program via a broadcast channel of a base station based upon a level of aggregate demand (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a processing system including a processor; and
   a computer-readable medium storing instructions which, when executed by the processing system, cause the processing system to perform operations, the operations comprising:
   identifying a trajectory of a mobile endpoint device that indicates the mobile endpoint device is anticipated to move from a first management area of a cellular network to a second management area of the cellular network, wherein the mobile endpoint device is currently being served in the first management area;
   identifying a first media program that is being broadcast by at least one base station in the first management area on a first broadcast channel that is tuned to by the mobile endpoint device;
   determining, based on the trajectory of the mobile endpoint device that indicates the mobile endpoint device is anticipated to move from the first management area of the cellular network to the second management area of the cellular network, a level of aggregate demand for the first media program in the second management area, wherein the level of aggregate demand for the first media program in the second management area is increased each time it is identified that a respective mobile endpoint device of a plurality of mobile endpoint devices is tuned to the first broadcast channel on which the first media program is being broadcast by the at least one base station in the first management area and a trajectory of the respective mobile endpoint device of the plurality of mobile endpoint devices is from the first management area toward the second management area, wherein the level of aggregate demand for the first media program in the second management area is increased when it is identified that the mobile endpoint device is tuned to the first broadcast channel on which the first media program is being broadcast by the at least one base station in the first management area and that the trajectory of the mobile endpoint device is from the first management area toward the second management area, wherein the plurality of mobile endpoint devices comprises the mobile endpoint device;
   assigning the first media program to a second broadcast channel of at least one base station in the second management area based upon the level of aggregate demand for the first media program in the second management area; and
   broadcasting the first media program via the second broadcast channel of the at least one base station in the second management area.

2. The device of claim 1, wherein the operations further comprise:
   broadcasting a manifest file via a third broadcast channel of the at least one base station in the second management area, the manifest file including identifications of a plurality of broadcast channels on which a plurality of media programs is broadcast at the at least one base station in the second management area and identifications of the plurality of media programs, the manifest file including an identification of the first media program and an identification of the second broadcast channel.

3. The device of claim 2, wherein the identifications of the plurality of broadcast channels comprise source specific multicast internet protocol addresses.

4. The device of claim 1, wherein the operations further comprise:
   receiving from the mobile endpoint device a join request comprising a source specific multicast internet protocol address of the second broadcast channel; and
   transmitting to the mobile endpoint device an identification of a radio frequency resource comprising the second broadcast channel.

5. The device of claim 1, wherein the operations further comprise:
   calculating levels of aggregate demand for a plurality of media programs in the second management area.

6. The device of claim 5, wherein a limited number of broadcast channels is available at the at least one base station in the second management area, wherein a subset of the plurality of media programs is selected for broadcasting via the limited number of broadcast channels based upon the levels of aggregate demand.

7. The device of claim 6, wherein N is the limited number of broadcast channels that is available at the at least one base station in the second management area, wherein a top N media programs of the plurality of media programs having the highest N levels of aggregate demand in the second management area are selected for broadcasting via the limited number of broadcast channels.

8. The device of claim 1, wherein the identifying the first media program comprises:
   requesting an identification of the first media program; and
   receiving the identification of the first media program in response to the request.

9. The device of claim 8, wherein a request of the requesting of the identification is sent to the mobile endpoint device and the identification is received from the mobile endpoint device.

10. The device of claim 8, wherein a request of the requesting of the identification is sent to a management device in the first management area and the identification is received from the management device in the first management area.

11. The device of claim 1, wherein the identifying the trajectory of the mobile endpoint device that indicates the mobile endpoint device is anticipated to move from the first management area to the second management area is based on at least one of:
    global positioning system location information;
    a sequence of base stations serving the mobile endpoint device in the cellular network; or
    base station triangulation information for the mobile endpoint device in the cellular network.

12. The device of claim 1, wherein the operations further comprise:
    identifying trajectories of a plurality of other mobile endpoint devices of the plurality of mobile endpoint devices that indicate the plurality of other mobile endpoint devices are anticipated to move into the second management area, wherein the level of aggregate demand for the first media program in the second management area is increased when it is identified that the plurality of other mobile endpoint devices is tuned to broadcast channels on which the first media program is being broadcast.

13. The device of claim 1, wherein the operations further comprise:
identifying a model user profile associated with a home region of the mobile endpoint device, wherein the model user profile indicates an affinity for a second media program; and
determining a level of aggregate demand for the second media program in the second management area, wherein the level of aggregate demand for the second media program in the second management area is increased when the model user profile indicates the affinity for the second media program.

14. The device of claim 13, wherein the operations further comprise:
assigning the second media program to an additional broadcast channel of the at least one base station in the second management area based upon the level of aggregate demand for the second media program in the second management area; and
broadcasting the second media program via the additional broadcast channel of the at least one base station in the second management area.

15. The device of claim 1, wherein the operations further comprise:
identifying a user profile of a user of the mobile endpoint device, wherein the user profile indicates an affinity of the user for a second media program; and
determining a level of aggregate demand for the second media program in the second management area, wherein the level of aggregate demand for the second media program in the second management area is increased when the user profile indicates the affinity of the user for the second media program.

16. The device of claim 15, wherein the operations further comprise:
assigning the second media program to an additional broadcast channel of the at least one base station in the second management area based upon the level of aggregate demand for the second media program in the second management area; and
broadcasting the second media program via the additional broadcast channel of the at least one base station in the second management area.

17. The device of claim 1, wherein the operations further comprise:
determining a level of aggregate demand for the first media program in the first management area, wherein the level of aggregate demand for the first media program in the first management area is decreased when it is identified that the mobile endpoint device is tuned to the first broadcast channel on which the first media program is being broadcast by the at least one base station in the first management area and that the trajectory of the mobile endpoint device is from the first management area toward the second management area.

18. The device of claim 17, wherein the operations further comprise:
reassigning the first media program from the first broadcast channel to a fourth broadcast channel of at least one other base station in the first management area based upon the level of aggregate demand for the first media program in the first management area.

19. A non-transitory computer-readable medium storing instructions which, when executed by a processing system including a processor, cause the processing system to perform operations, the operations comprising:
identifying a trajectory of a mobile endpoint device that indicates the mobile endpoint device is anticipated to move from a first management area of a cellular network to a second management area of the cellular network, wherein the mobile endpoint device is currently being served in the first management area;
identifying a first media program that is being broadcast by at least one base station in the first management area on a first broadcast channel that is tuned to by the mobile endpoint device;
determining, based on the trajectory of the mobile endpoint device that indicates the mobile endpoint device is anticipated to move from the first management area of the cellular network to the second management area of the cellular network, a level of aggregate demand for the first media program in the second management area, wherein the level of aggregate demand for the first media program in the second management area is increased each time it is identified that a respective mobile endpoint device of a plurality of mobile endpoint devices is tuned to the first broadcast channel on which the first media program is being broadcast by the at least one base station in the first management area and a trajectory of the respective mobile endpoint device of the plurality of mobile endpoint devices is from the first management area toward the second management area, wherein the level of aggregate demand for the first media program in the second management area is increased when it is identified that the mobile endpoint device is tuned to the first broadcast channel on which the first media program is being broadcast by the at least one base station in the first management area and that the trajectory of the mobile endpoint device is from the first management area toward the second management area, wherein the plurality of mobile endpoint devices comprises the mobile endpoint device;
assigning the first media program to a second broadcast channel of at least one base station in the second management area based upon the level of aggregate demand for the first media program in the second management area; and
broadcasting the first media program via the second broadcast channel of the at least one base station in the second management area.

20. A method, comprising:
identifying, by a processing system including a processor, a trajectory of a mobile endpoint device that indicates the mobile endpoint device is anticipated to move from a first management area of a cellular network to a second management area of the cellular network, wherein the mobile endpoint device is currently being served in the first management area;
identifying, by the processing system, a first media program that is being broadcast by at least one base station in the first management area on a first broadcast channel that is tuned to by the mobile endpoint device;
determining, by the processing system, based on the trajectory of the mobile endpoint device that indicates the mobile endpoint device is anticipated to move from the first management area of the cellular network to the second management area of the cellular network, a level of aggregate demand for the first media program in the second management area, wherein the level of aggregate demand for the first media program in the second management area is increased each time it is identified that a respective mobile endpoint device of a plurality of mobile endpoint devices is tuned to the first broadcast channel on which the first media program is being broadcast by the at least one base station in the first management area and a trajectory of the respective mobile endpoint device of the plurality of mobile endpoint devices is from the first management area toward the second management area, wherein the level of aggregate demand for the first media program in the second management area is increased when it is identified that the mobile endpoint device is tuned to the first broadcast channel on which the first media program is being broadcast by the at least one base station in the first management area and that the trajectory of the mobile endpoint device is from the first management area toward the second management area, wherein the plurality of mobile endpoint devices comprises the mobile endpoint device;

assigning, by the processing system, the first media program to a second broadcast channel of at least one base station in the second management area based upon the level of aggregate demand for the first media program in the second management area; and broadcasting, by the processing system, the first media program via the second broadcast channel of the at least one base station in the second management area.

* * * * *